(12) United States Patent
Church (10) Patent No.: US 10,060,487 B2
(45) Date of Patent: Aug. 28, 2018

(54) NOISE DAMPENING BRAKE SHOE FOR A DRUM BRAKE

(71) Applicant: Bendix Spicer Foundation Brake LLC, Elyria, OH (US)

(72) Inventor: David R. Church, Richland, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 15/881,829

(22) Filed: Jan. 29, 2018

(65) Prior Publication Data

US 2018/0163799 A1 Jun. 14, 2018

Related U.S. Application Data

(62) Division of application No. 14/948,735, filed on Nov. 23, 2015.

(51) Int. Cl.
*F16D 65/08* (2006.01)
*F16D 65/00* (2006.01)

(52) U.S. Cl.
CPC ......... *F16D 65/0018* (2013.01); *F16D 65/08* (2013.01)

(58) Field of Classification Search
CPC ... F16D 65/0006; F16D 65/0018; F16D 65/08
See application file for complete search history.

(56) References Cited

U.S. PATENT DOCUMENTS

| 1,910,590 A | 5/1933 | Charles |
|---|---|---|
| 4,452,347 A | 6/1984 | Dozier |
| 5,515,952 A | 5/1996 | Jackson |
| 5,887,686 A | 3/1999 | Tanaka et al. |
| 5,971,112 A | 10/1999 | Okada et al. |
| 6,336,533 B1 | 1/2002 | Pollock et al. |
| 7,815,022 B2 | 10/2010 | Aydt et al. |
| 7,845,478 B2 | 12/2010 | Picot |

(Continued)

FOREIGN PATENT DOCUMENTS

| CA | 2027270 A1 | 4/1991 |
|---|---|---|
| CN | 204493540 U | 7/2015 |
| DE | 2914629 A1 | 10/1980 |

(Continued)

OTHER PUBLICATIONS

English language abstract for CN 204493540 U.

(Continued)

*Primary Examiner* — Bradley T King
(74) *Attorney, Agent, or Firm* — Reising Ethington P.C.

(57) ABSTRACT

A brake shoe for a drum brake includes a brake table and one or more webs supporting the brake table. One end of each web is pivotally coupled to an associated brake spider and another end of each web responds to a force applied by an actuator that causes the brake shoe to move between positions of engagement and disengagement with an associated braking surface. The brake shoe further includes means for damping movement of the brake shoe, during engagement of the brake shoe with the braking surface, for a natural frequency of the brake shoe having an order of at least two and a causing a bending modal shape of the brake shoe. In one embodiment, the damping means includes a damping plate disposed on one side of a web. A spring acts on a side of the plate opposite the web to urge the plate towards the web.

7 Claims, 6 Drawing Sheets

(56) References Cited

U.S. PATENT DOCUMENTS

| | | |
|---|---|---|
| 8,157,063 B2 | 4/2012 | Kulis, Jr. et al. |
| 2010/0012444 A1 | 1/2010 | Flodin et al. |

FOREIGN PATENT DOCUMENTS

| | | |
|---|---|---|
| GB | 2346421 B | 4/2003 |
| JP | S52-64569 A | 5/1977 |
| JP | S57-103942 A | 6/1982 |
| JP | S57-134029 A | 8/1982 |
| JP | S60-18628 A | 1/1985 |
| JP | 2762266 B2 | 6/1998 |
| KR | 10-2004-0042548 A | 5/2004 |
| KR | 10-0594612 B1 | 6/2006 |

OTHER PUBLICATIONS

English language abstract for JP S52-64569A.
English language abstract for JP S57-103942A.
English language abstract for S57-134029 A.
English language abstract for JP S60-18628 A.
English language abstract for JP 2762266 B2.
Machine generated English translation of JP 2762266 B2.
English language abstract for KR 10-2004-0042548 A.
English language abstract for KR 10-0594612 B1.
Examination report issued in corresponding Canadian Patent Application No. 2949030 (dated Dec. 11, 2017).

FIG. 10

NOISE DAMPENING BRAKE SHOE FOR A DRUM BRAKE

CROSS-REFERENCE TO RELATED APPLICATIONS

This application is a divisional application of U.S. patent application Ser. No. 14/948,735 filed Nov. 23, 2015, the entire disclosure of which is incorporated herein by reference.

BACKGROUND OF THE INVENTION a. Field of the Invention

This invention relates to vehicle brakes. In particular, the invention relates to a brake shoe for a drum brake assembly that is configured to reduce resonance of the brake shoe during engagement of the brake to reduce brake noise.

b. Background Art

In a conventional drum brake, a drum rotates with a wheel or wheels proximate to one end of an axle. The drum defines a radially inner braking surface. A brake spider is disposed about the axle and a pair of brake shoes are pivotally mounted at one end to the brake spider. The opposite end of each brake shoe is engaged by an actuating member such as a cam to move the brake shoes between positions of engagement and disengagement with the braking surface of the brake drum.

Some drum brakes emit a low-frequency noise or squeal (e.g., a single tone noise within the audible range of humans typically between 80 and 120 decibels) during application of the brakes when the brake shoes engage the braking surface of the drum. The noise occurs when multiple components in the brake resonate at a common natural frequency or multiple thereof. This noise is unpleasant and distracting to the driver of the vehicle from which the noise emanates and to others within the audible range of the noise including drivers in surrounding vehicles. The noise can also result in warranty claims by vehicle owners asserting that the brake is not functioning properly.

The inventor herein has recognized a need for a brake shoe for a drum brake that will reduce one or more of the above-identified deficiencies and/or provide improved performance.

BRIEF SUMMARY OF THE INVENTION

This invention relates to vehicle brakes. In particular, the invention relates to a brake shoe for a drum brake assembly that is configured to reduce resonance of the brake shoe during engagement of the brake to reduce brake noise.

A brake shoe for a drum brake in accordance with one embodiment of the invention includes a brake table and a web supporting the brake table and having first and second ends. The first end is configured for pivotally coupling to an associated brake spider of the drum brake and the second end is configured to respond to a force applied by an actuator that causes the brake shoe to move between positions of engagement and disengagement with an associated braking surface. The brake shoe further includes a damping plate disposed on a first side of the web. The damping plate includes a first side facing the first side of the web and a second side opposite the first side of the damping plate. The brake shoe further includes a fastener coupling the damping plate to the web. The fastener defines a shank extending through a set of aligned bores in the damping plate and web. The brake shoe further includes a spring supported on the fastener and disposed on the second side of the damping plate and urging the damping plate towards the web.

A brake shoe for a drum brake in accordance with another embodiment of the invention includes a brake table and first and second webs supporting the brake table and spaced from one another. Each of the first and second webs includes first and second ends. The first end of each of the first and second webs is configured for pivotally coupling to an associated brake spider of the drum brake and the second end of each of the first and second webs is configured to respond to a force applied by an actuator that causes the brake shoe to move between positions of engagement and disengagement with an associated braking surface. The brake shoe further includes a first damping plate disposed on an inboard side of the first web and a second damping plate disposed on an inboard side of the second web. The brake shoe further includes at least one fastener coupling the first damping plate to the first web and the second plate to the second web and a first spring disposed about the at least one fastener between the first and second damping plates.

A brake shoe for a drum brake in accordance with another embodiment of the invention includes a brake table and a web supporting the brake table and having first and second ends. The first end is configured for pivotally coupling to an associated brake spider of the drum brake and the second end is configured to respond to a force applied by an actuator that causes the brake shoe to move between positions of engagement and disengagement with an associated braking surface. The brake shoe further includes a damping plate disposed on a first side of the web and coupled to the web. The damping plate is configured to, during engagement of the brake shoe with the associated braking surface, dampen movement of the brake shoe for a natural frequency of the brake shoe having an order of at least two and a causing a bending modal shape of the brake shoe.

A brake shoe for a drum brake in accordance with another embodiment of the invention includes a brake table and a web supporting the brake table and having first and second ends. The first end is configured for pivotally coupling to an associated brake spider of the drum brake and the second end is configured to respond to a force applied by an actuator that causes the brake shoe to move between positions of engagement and disengagement with an associated braking surface. The brake shoe further includes means for damping movement of the brake shoe, during engagement of the brake shoe with the associated braking surface, for a natural frequency of the brake shoe having an order of at least two and a causing a bending modal shape of the brake shoe.

A brake shoe for a drum brake in accordance with the invention represents an improvement as compared to conventional brake shoes. As noted hereinabove, conventional drum brake assemblies emit a low frequency noise or squeal during application of the brakes when the brake shoes engage the braking surface of the drum. It has been determined that this noise results, in part, from a resonance of natural frequencies in the brake drum, brake shoes and other brake components and, in particular, resonance at certain natural frequencies that generate bending modal shapes in the brake shoes. The inventors herein have developed a configuration of a brake shoe that reduces resonance and modal and operating deflection shapes of the brake shoe by dampening movement of the brake shoe for second order or grater natural frequencies of the brake shoe that cause bending modal shapes of the brake shoe. As a result, the inventive brake shoe reduces the typical squeal that occurs during engagement of the brake.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
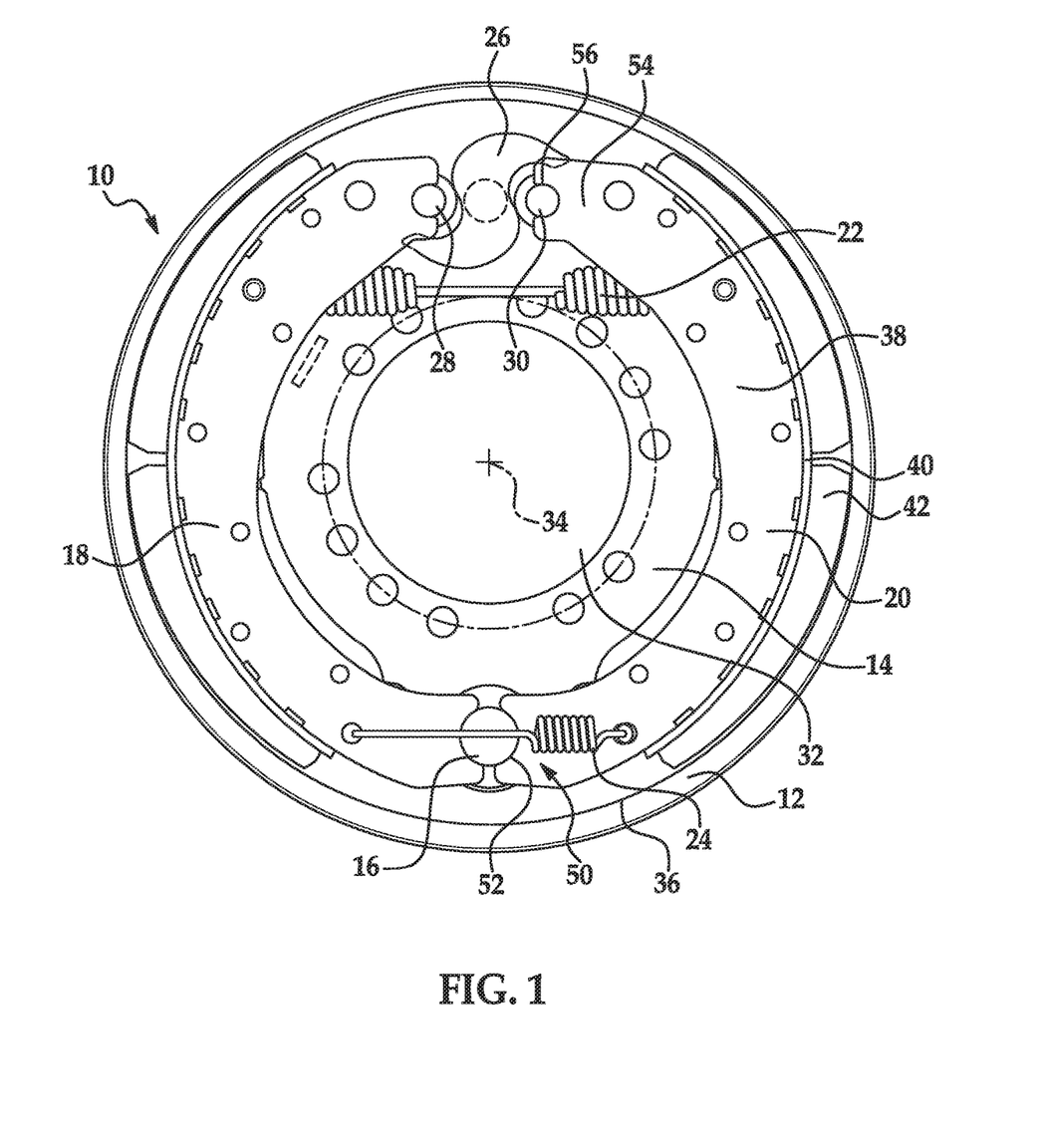
FIG. 1 is a plan view of a drum brake assembly incorporating a brake shoe in accordance with one embodiment of the present teachings.

Referring now to the drawings wherein like reference numerals are used to identify identical components in the various views, FIG. 1 illustrates a drum brake 10. Brake 10 is provided to slow rotation of one or more vehicle wheels. Brake 10 is particularly adapted for use in heavy vehicles. It should be understood, however, that brake 10 may be used on a wide variety of vehicles and in non-vehicular applications. Brake 10 is configured to act against an annular brake drum 12 that rotates with the vehicle wheel or wheels at one end of an axle (not shown). Brake 10 may include a brake spider 14, one or more anchor pins 16, brake shoes 18, 20, return and retaining springs 22, 24, and means, such as cam 26 and rollers or cam followers 28, 30, for moving brake shoes 18, 20 between positions of engagement and disengagement with a braking surface.

Spider 14 is provided to mount the various components of brake 10. Spider 14 defines a central aperture 32 having a center axis 34 which may be coincident with the rotational axis of the vehicle wheel. The aperture 32 is configured to receive a vehicle axle extending therethrough and along axis 34. Spider 14 may further define bores (not shown) on either side of aperture 32 configured to receive anchor pin 16 and a camshaft (not shown) supporting cam 26.

Anchor pin 16 is provided to pivotally mount brake shoes 18, 20 to brake spider 14. Anchor pin 16 may comprise a round pin and may be mounted on and extend from brake spider 14. Although only a single anchor pin 16 is shown in the illustrated embodiment, it should be understood that brake shoes 18, 20 may be mounted on separate anchor pins 16 at some distance apart.

Figure 2:
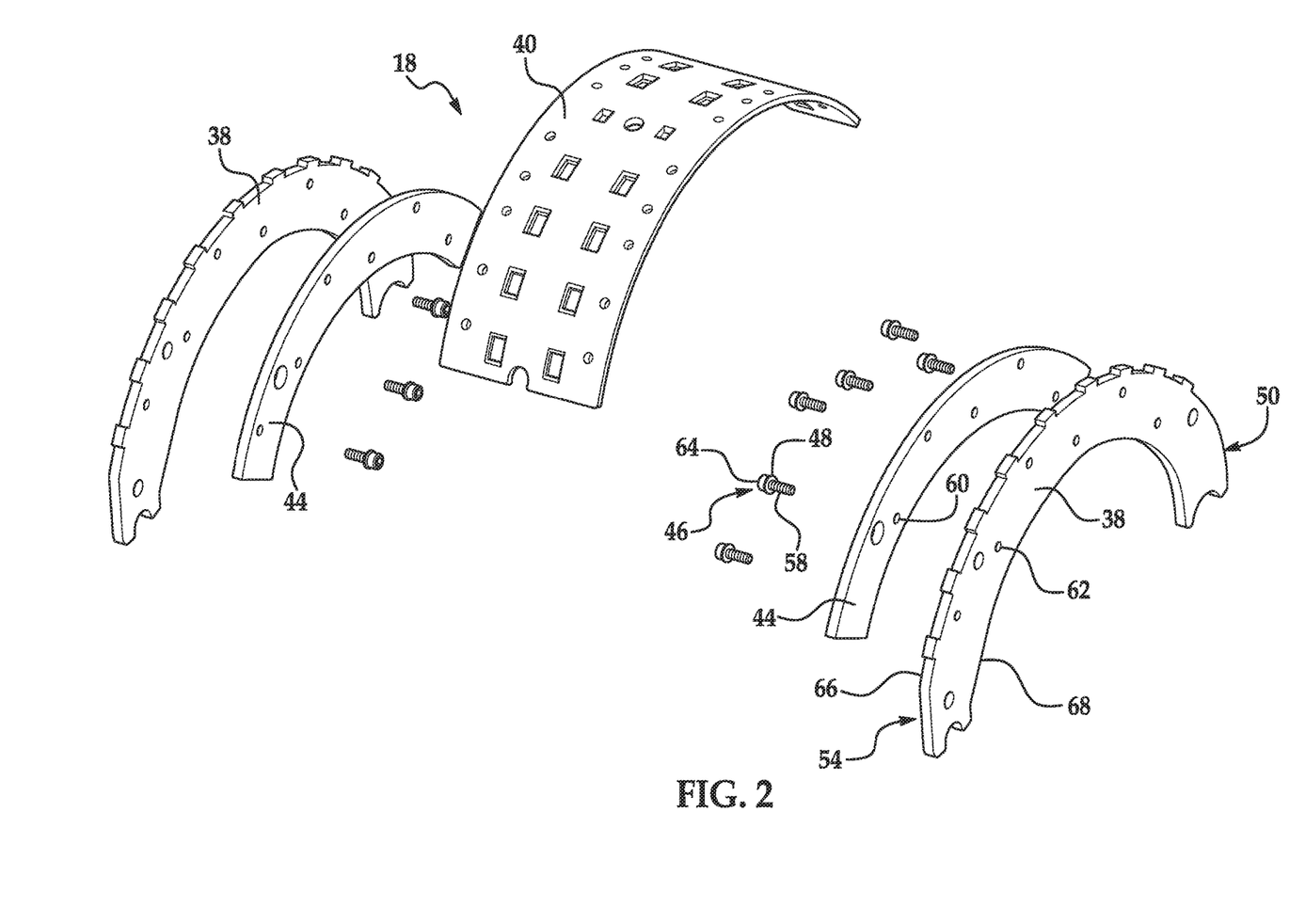
FIG. 2 is an exploded perspective view of a brake shoe in accordance with one embodiment of the present teachings.
Figure 3:
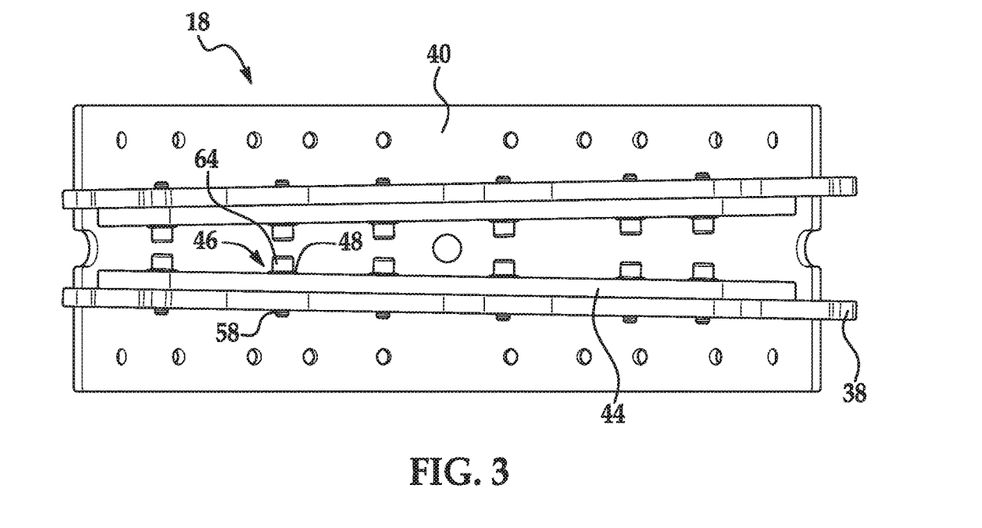
FIG. 3 is a plan view of the assembled brake shoe of FIG. 2.
Figure 4:
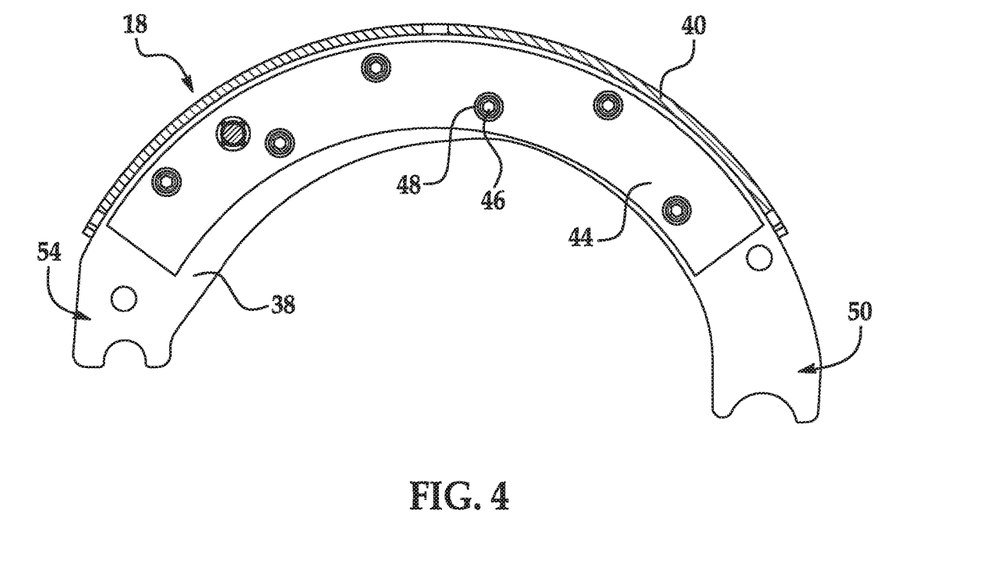
FIG. 4 is a plan view of a portion of the brake shoe of FIGS. 2-3.

Brake shoes 18, 20 are provided for selective engagement with an associated braking surface 36 of drum 12 in order to apply a braking torque to the drum and one or more vehicle wheels. Brake shoes 18, 20 are supported on anchor pin(s) 16 and thereby pivotally coupled to spider 14 at one end. Each brake shoe 18, 20 may include one or more webs 38, a brake table 40, and one or more brake linings 42. Referring to FIGS. 2-4, in accordance with one aspect of the present teachings, brakes shoes 18, 20 further includes means, such as damping plates 44 for damping movement of the brake shoes 18, 20 during engagement of the brake shoes 18, 20 with braking surface 36 and means, such as fasteners 46 and springs 48, for coupling damping plates 44 to webs 38.

Referring again to FIG. 1, webs 38 support brake table 40. Webs 38 may also provide a connection point for return spring 22 and retaining spring 24. Webs 38 may be made from metals and metal alloys such as steel. Webs 38 are arcuate in shape and extend between opposite ends of brake shoes 18, 20. It should be understood that the number of webs 38 in each brake 18, 20 may vary and each brake shoe 18, 20 may therefore include a plurality of webs 38 that extend generally parallel to one another. Webs 38 may be secured to brake table 40 using welds or other conventional fastening means. Each web 38 may have one end 50 that defines a semicircular recess 52 configured to receive a corresponding anchor pin 16 and an opposite end 54 that defines a semicircular recess 56 configured to engage one of rollers 28, 30.

Brake table 40 is provided to support brake linings 42. Table 40 is supported on webs 38 and may be arcuate in shape. Table 40 may be made from conventional metals and metal alloys including steel.

Brake linings 42 are provided for frictional engagement with braking surface 36 of drum 12. Linings 42 may be made from conventional friction materials. Brake linings 42 are disposed on brake table 40 and may be secured to brake table 40 using a plurality of rivets or other conventional fasteners including adhesives.

Referring again to FIGS. 2-4, damping plates 44 dampen movement of brake shoes 18, 20 during engagement of brake shoes 18, 20 with braking surface 36. Plates 44 may be made from conventional metal and metal alloys. Plates 44 may be unitary (i.e. one piece) in construction and arcuate in shape. Plates 44 may be disposed on either side of webs 38. Referring to FIGS. 2-3, in one embodiment, brakes shoes 18, 20 each have two webs 38 that are spaced from one another and plates 44 are disposed on the inboard side of each web 38 such that plates 44 face one another.

Plates 44 are specifically configured to dampen movement of the brake shoes 18, 20 for at least one natural frequency of the brake shoes 18, 20 having an order of at least two and a causing a bending modal shape of the brake shoes 18, 20. The inventor has determined that a significant cause of low-frequency noise or squeal is the result of resonance of the brake shoes 18, 20 at certain natural or modal frequencies. Brakes shoes 18, 20 have a plurality of natural or modal frequencies at which brakes shoes 18, 20 may resonate. At each of these frequencies, brakes shoes 18, 20 assume a modal shape. At certain frequencies, the shape results from twisting of brake shoes 18, 20. At other frequencies, the shape results from bending of brake shoes 18, 20. The first order natural frequency results in a twisting modal shape for brake shoes 18, 20. The second order natural frequency results in a bending modal shape for brake shoes 18, 20.

Higher order natural frequencies may also result in twisting or bending modal shapes. The inventor has determined that a natural frequency of brake shoes 18, 20 between 1000 Hz and 1500 HZ, and more typically between 1100 Hz and 1400 Hz, results in a bending modal shape, a relatively large operating deflection shape, and low-frequency noise or squeal during brake engagement where the frequency approaches a corresponding natural frequency of the brake drum 12. Damping plates 44 are specifically configured to reduce the resonance, modal shape and/or operating deflection shape of the brake shoes 18, 20 at these frequencies to reduce noise. In particular, and with reference to FIG. 4, damping plates 44 have a similar shape relative to webs 38. Damping plates 44 are arcuate and extend over a relatively large portion of the circumferential length of webs 38. In accordance with one aspect of the invention, plate 44 may have a circumferential length that is at least 70% of the circumferential length of web 38. Plate 44 may also have a radial width that is about equal to the radial width of web 38. Where the radial width of web 38 varies as shown in FIG. 4, the radial width of plate 44 may be constant across the circumferential length of plate 44 and about equal to the shortest radial width of web 38 as shown in FIG. 4 or may vary across the circumferential length of plate 44 so that the radial width of web 38 increases or decreases in a corresponding manner with increases and decreases in the radial width of web 38. Plate 44 may also have an axial thickness that is about equal to an axial thickness of web 38. The configuration of plates 44 dampens movement of brakes shoes 18, 20 at second order or greater natural frequencies that cause bending modal shapes of brake shoes 18, 20. The relative length of damping plates 44 helps to dampen vibration at the ends 50, 54 of the brake shoes 18, 20 and the size of damping plates 44 provides a relatively large contact area with web 38 to create sufficient damping friction and resist bending in plates 44 as the brake shoes 18, 20 attempt to bend.

Figure 5:
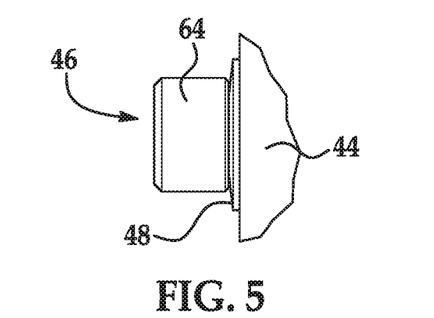
FIG. 5 is an enlarged view of a portion of the brake shoe of FIGS. 2-4 showing a portion of one embodiment of a means for coupling a damping plate to a web of the brake shoe.

Fasteners 46 and springs 48 are provided to couple damping plates 44 to webs 38 and, further, to do so in a way that both allows plates 44 to dampen movement of shoes 18, 20 while allowing shoes 18, 20 to flex during operation of brake 10. Fasteners 46 may comprise bolts including, for example, shoulder bolts. Referring to FIGS. 2-3, each fastener 46 defines a shank 58 that extends through a set of aligned bores 60, 62 in a plate 44 and web 38, respectively, and a head 64 disposed at one end of the shank 58. The shank 58 may be threaded. The head 64 is disposed on the same side of web 38 as damping plate 44 and on a side of damping plate 44 opposite the side of damping plate 44 facing web 38. In accordance with one aspect of the disclosed embodiment, springs 48 are disposed between the head 64 of each fastener 46 and damping plate 44. Springs 48 are compression springs such that springs 48 bias the heads 64 of fasteners 46 away from plate 44. As a result, damping plates 44 lightly contact webs 38 to allow relative movement and frictional damping while also allowing brake shoes 18, 20 to flex. Referring to FIG. 5, springs 48 may comprise conical spring washers or Belleville washers. Alternatively, springs 48 may comprise coil springs or leaf springs. The spring force or stiffness of springs 48 is chosen to create a sufficient frictional contact load between damping plate 44 and web 38 without locking plate 44 and web 38 together. Referring to FIG. 2, in the illustrated embodiment six fasteners 46, each including a spring 48, are used to couple each mounting plate 44 to a corresponding web 38. Moving from the end 54 of web 38 configured to receive cam follower 28 or 30 towards the end 50 of web 38 configured to receive anchor pin 16, the first fastener 46 and spring 48 are disposed nearer to a radially outer edge 66 of web 38 than a radially inner edge 68 of web 38. The next fastener 46 and spring 48 are disposed nearer to the inner edge 68 than the outer edge 66. The next fastener 46 and spring 48 are again disposed nearer to the outer edge 66 than the inner edge 68 and this alternating pattern repeats for the remaining fasteners 46 and springs 48. This alternating pattern provides relatively uniform contact of plate 44 to web 38 along the circumferential length and radial width of plate 44 and dampens torsional movements of webs 38. Although the illustrated embodiment includes six fasteners 46 and springs 48, it should be understood that the number of fasteners 46 and springs 48 may vary provided a sufficient number of fasteners 46 and springs 48 are used to provide a light contact force between plate 44 and web 38 along the circumferential length of plate 44.

Figure 6:
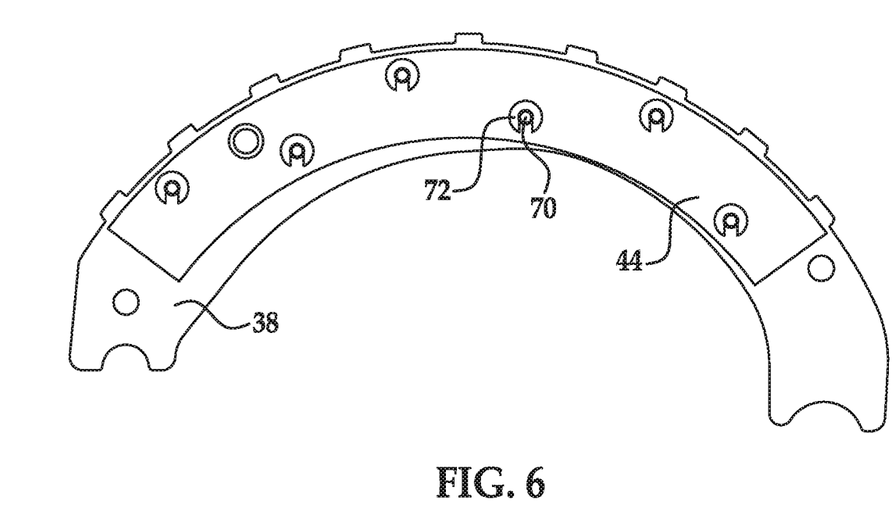
FIG. 6 is a plan view of a portion of a brake shoe showing another embodiment of a means for coupling a damping plate to a web of a brake shoe.
Figure 7:
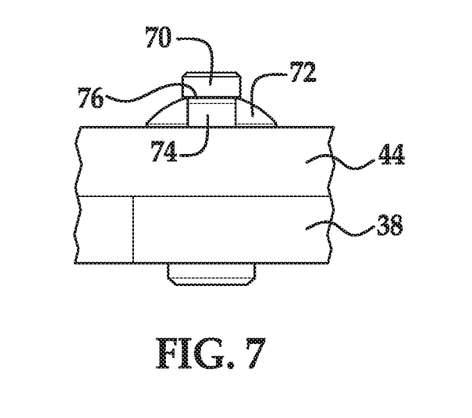
FIG. 7 is an enlarged view of a portion of the brake shoe of FIG. 6.

Referring now to FIGS. 6-7, an alternate means for coupling damping plates 44 to webs 38 is shown comprising fasteners 70 and springs 72. Fastener 70 may comprise a pin or other type of fastener having a shank 74 configured to extend through aligned bores 60, 62 in a plate 44 and web 38, respectively. Shank 74 may define a groove 76 in a surface of shank 74 configured to receive and retain a portion of spring 72 in a such way that spring 72 is retained on shank 74 and able to exert a spring force on a side of damping plate 44 opposite web 38. Spring 72 may assume a variety of forms including a curved spring clip with a U-shaped recess configured to receive shank 74 of fastener 70 or a conical, annular spring clip through which the shank 74 extends and having inwardly extending tabs configured to be received within groove 76. Fasteners 70 and springs 72 may be arranged along the circumferential length of damping plate 44 in a manner similar to fasteners 46 and springs 48 in the embodiment of FIGS. 2-4.

Figure 8:
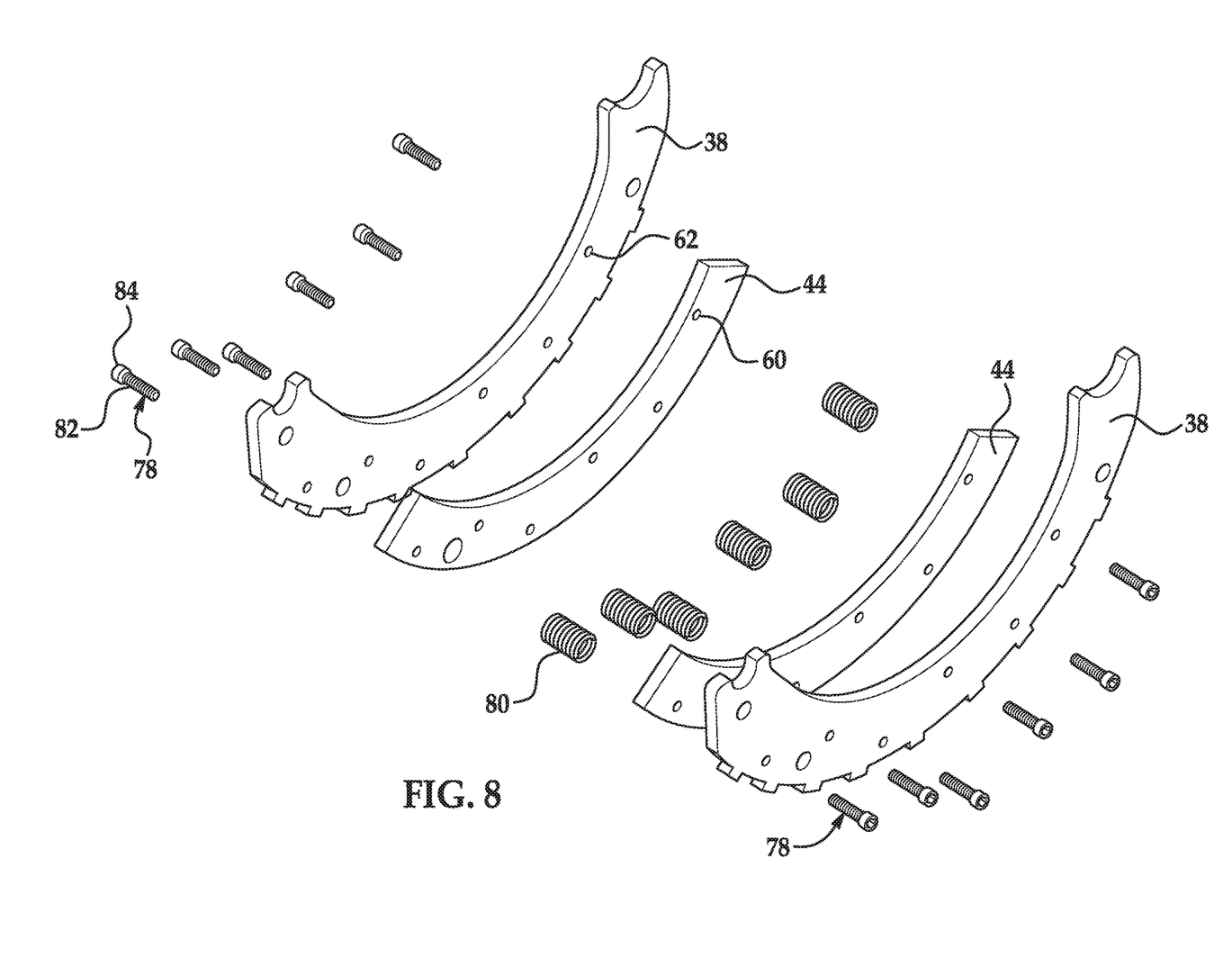
FIG. 8 is an exploded perspective view of a brake shoe incorporating another embodiment of a means for coupling a damping plate to a web of a brake shoe.
Figure 9:
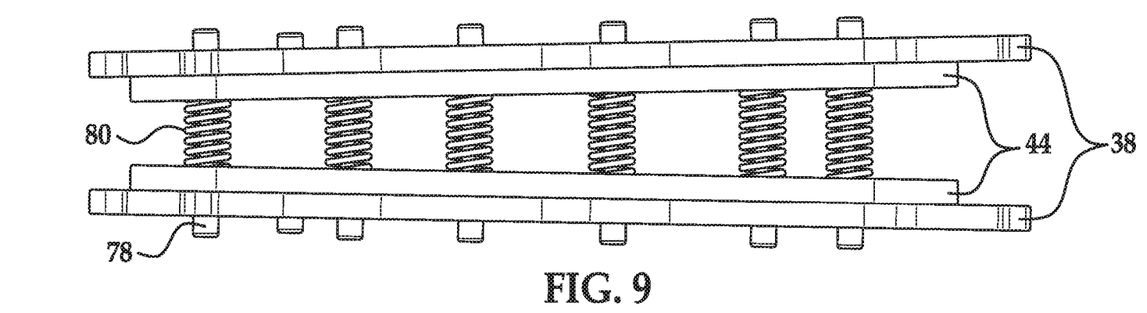
FIG. 9 is a plan view of the assembled brake shoe of FIG. 8.
Figure 10:
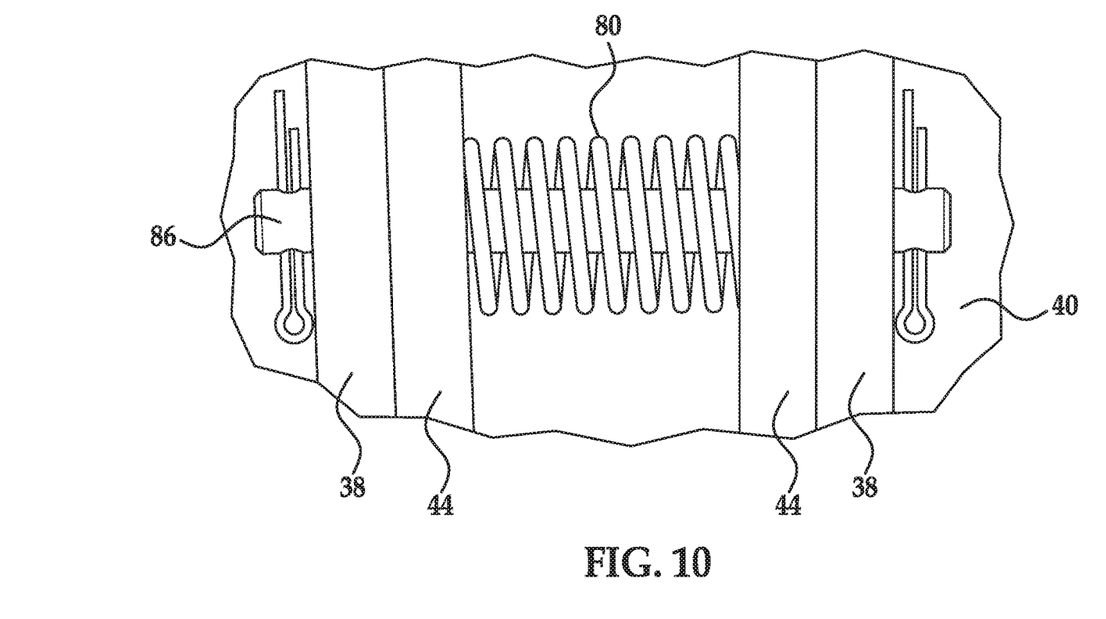
FIG. 10 is a plan view of another embodiment of a means for coupling a damping plate to a web of a brake shoe.

Referring now to FIGS. 8-9, another alternate means for coupling damping plates 44 to webs 38 is shown comprising fasteners 78 and springs 80. Fasteners 78 may again comprise bolts including, for example, shoulder bolts with each fastener 78 defines a shank 82 that extends through a set of aligned bores 60, 62 in a plate 44 and web 38, respectively, and a head 84 disposed at one end of the shank 82. The shank 82 may be threaded. The head 84 is disposed on the opposite side of web 38 as damping plate 44 (i.e., on the outboard side of web 38). In the embodiment illustrated in FIGS. 8-9, separate fasteners 78 are used to couple a damping plate 44 to each web 38 of the brake shoe. Referring to FIG. 10, in an alternate embodiment, a single fastener 86 such as pin may be instead extend through the aligned bores 60, 62 in each of the two webs 38 and plates 44 and may be secured in place through an interference fit or through, for example, use of one or more retaining clips or cotter pins. Springs 80 are disposed about the fasteners 78 or 86 between the damping plates 44 coupled to each web 38. In the embodiment shown in FIGS. 8-9, springs 80 are disposed about shanks 84 of two aligned fasteners 78. In the embodiment shown in FIG. 10, spring 80 is disposed about the body of fastener 86. Springs 80 may comprise compression springs that exert a force on each damping plate 44 to urge each damping plate toward a respective web 38. Fasteners 78 or 86 and springs 80 may again be arranged along the circumferential length of damping plates 44 in a manner similar to fasteners 46 and springs 48 in the embodiment of FIGS. 2-4.

Referring again to FIG. 1, return spring 22 is provided to bias brake shoes 18, 20 to a position of disengagement from the braking surface 36 of drum 12. Retainer springs 24 are provided to retain brake shoes 18, 20—and particularly webs 38—on anchor pin(s) 16. Springs 22, 24 are conventional in the art. The ends of spring 22 may engage pins (not shown) extending from webs 38 of brakes shoes 18, 20 while the ends of springs 24 extend through corresponding apertures in webs 38 of brake shoes 18, 20.

Cam 26, together with rollers 28, 30, provides an actuating assembly or means for moving brake shoes 18, 20 between positions of engagement with and disengagement from the braking surface 36 of the drum 12. Cam 26 is disposed at one end of camshaft (not shown) that is coupled to a brake actuator that controls rotation of the camshaft and cam 26 in order to apply or release brake 10. Cam 26 comprises a doubled lobed S-cam having a cam surface that is configured to engages cam followers 28, 30.

Rollers 28, 30 are provided to transfer brake actuation forces from cam 26 to brake shoes 18, 20. Rollers 28, 30 are circular in cross-section and are configured to be received within recesses 56 of webs 38 formed at end 54 of shoes 18, 20. Rollers 28, 30 engage webs 38 and cam 26 and follow the surface of the cam 26 as it rotates thereby causing shoes 18, 20 to pivot about a pivot axis defined at the center of anchor pin 16.

A brake shoe 18, 20 for a drum brake 10 in accordance with the invention represents an improvement as compared to conventional brake shoes. The addition of specifically configured damping plates 44 reduces resonance and model and operating deflection shapes of the brake shoes 18, 20 by dampening movement of the brake s hoes 18, 20 for specific natural frequencies that have been determined to contribute significantly to brake noise during application of brake 10. Further, the use and location of fasteners 46, 70, 78, or 86 and springs 48, 72 or 80 in coupling plates 44 to webs 38 allows the plates 44 to provide a frictional damping function while still allowing brakes shoes 18, 20 to flex.

While the invention has been shown and described with reference to one or more particular embodiments thereof, it will be understood by those of skill in the art that various changes and modifications can be made without departing from the spirit and scope of the invention.

What is claimed is:

1. A brake shoe for a drum brake, comprising:
    a brake table;
    first and second webs supporting the brake table and spaced from one another, each of the first and second webs having first and second ends, the first end of each of the first and second webs configured for pivotally coupling to an associated brake spider of the drum brake and the second end of each of the first and second webs configured to respond to a force applied by an actuator that causes the brake shoe to move between positions of engagement and disengagement with an associated braking surface;
    a first damping plate disposed on an inboard side of the first web;
    a second damping plate disposed on an inboard side of the second web;
    at least one fastener coupling the first damping plate to the first web and the second plate to the second web; and,
    a first spring disposed about the at least one fastener between the first and second damping plates.

2. The brake shoe of claim 1, wherein the at least one fastener comprises a first fastener extending through a first set of aligned bores in the first web and the first damping plate and a second fastener extending through a second set of aligned bores in the second web and the second damping plate, the first spring disposed about the first and second fasteners.

3. The brake shoe of claim 1, further comprising:
    at least one additional fastener coupling the first damping plate to the first web and the second plate to the second web; and,
    a second spring disposed about the at least one additional fastener between the first and second damping plates.

4. The brake shoe of claim 1 wherein the first damping plate is a unitary body.

5. The brake shoe of claim 1 wherein the first damping plate has a length that is at least seventy percent of a length of the first web and the second damping plate has a length that is at least seventy percent of a length of the second web.

6. The brake shoe of claim 1 wherein the first spring comprises a compression spring.

7. The brake shoe of claim 1 wherein the first and second damping plates are configured to, during engagement of the brake shoe with the associated braking surface, dampen movement of the brake shoe for at least one natural frequency of the brake shoe having an order of at least two and causing a bending modal shape of the brake shoe.

* * * * *